United States Patent [19]

Masuda

[11] 4,129,901

[45] Dec. 12, 1978

[54] PLURAL-SEQUENCE CONTROL SYSTEM

[75] Inventor: Ikuro Masuda, Hitachi, Japan

[73] Assignee: Hitachi, Ltd., Japan

[21] Appl. No.: 784,810

[22] Filed: Apr. 5, 1977

[30] Foreign Application Priority Data

Apr. 9, 1976 [JP] Japan ................................. 51-39197

[51] Int. Cl.² .......................... G05B 11/00; G06F 9/16
[52] U.S. Cl. ..................................... 364/104; 364/900
[58] Field of Search ...................... 235/151.1, 151.11; 364/200 MS File, 900 MS File, 104, 107

[56] References Cited

U.S. PATENT DOCUMENTS

| 3,602,889 | 8/1971 | Gayman et al. | 364/200 |
| 3,693,163 | 9/1972 | Johnson et al. | 364/200 |
| 3,741,246 | 6/1973 | Braytenbah | 364/200 |
| 3,753,243 | 8/1973 | Ricketts, Jr. et al. | 364/200 |
| 3,921,146 | 11/1975 | Danco | 364/200 |

*Primary Examiner*—Gareth D. Shaw
*Assistant Examiner*—Michael C. Sachs
*Attorney, Agent, or Firm*—Craig & Antonelli

[57] ABSTRACT

A sequence control system is disclosed which is suitable for control of plural objects to at least some of which similar control sequence operations are performed. In addition to a logical operation unit for receiving signals representative of states of the controlled objects through an I/O device to perform the operations for the desired controls, and a memory unit for storing programmed instructions for logical operations by the logical operation unit at predetermined program addresses, the system is provided with a device for executing repeatedly the processings common to the objects to be controlled. The time required for the processing in the logical operation unit for controlling the objects requiring similar control operations can be remarkably reduced. The system has an excellent utility in applications such as numerical control apparatus in which many objects have substantially identical control operations and are to be controlled at high rate.

5 Claims, 6 Drawing Figures

FIG. 2
PRIOR ART

| INSTRUC-TIONS | DESCRIPTIONS | CONTENTS OF PROCESSINGS |
|---|---|---|
| AND | AND, n | $(n)\cdot(A) \rightarrow (A)$ |
| OR | OR, n | $(n)+(A) \rightarrow (A)$ |
| EOR | EOR, n | $(n)\oplus(A) \rightarrow (A)$ |
| NOT | NOT, | $(\overline{A}) \rightarrow (A)$ |
| IN | IN, n | $(n) \rightarrow (A)$ |
| OUT | OUT, n | $(A) \rightarrow (n)$ |
| JMP | JMP, n | $n \rightarrow (PC)$ |
| JTC | JTC, n | IF $(A)=1$, $n \rightarrow (PC)$<br>IF $(A)\neq 1$, $(PC)+1 \rightarrow (PC)$ |
| NOP | NOP | |

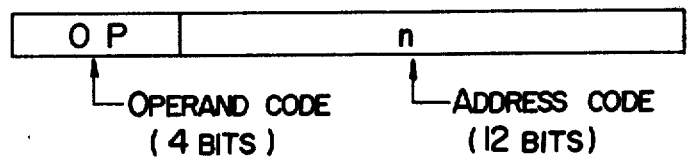

OPERAND CODE (4 BITS)　　ADDRESS CODE (12 BITS)

| INSTRUCTIONS | DESCRIPTIONS | CONTENTS OF PROCESSINGS |
|---|---|---|
| ABS | ABS, n | n → (ABR) |
| CAL | CAL, n | n → (PC), (PC)SAVE |
| CLC | CLC, n | IF(A)=1, n→(PC),(PC)SAVE<br>IF(A)≠1, (PC)+1→(PC) |
| RET | RET | (PC)RETURN |

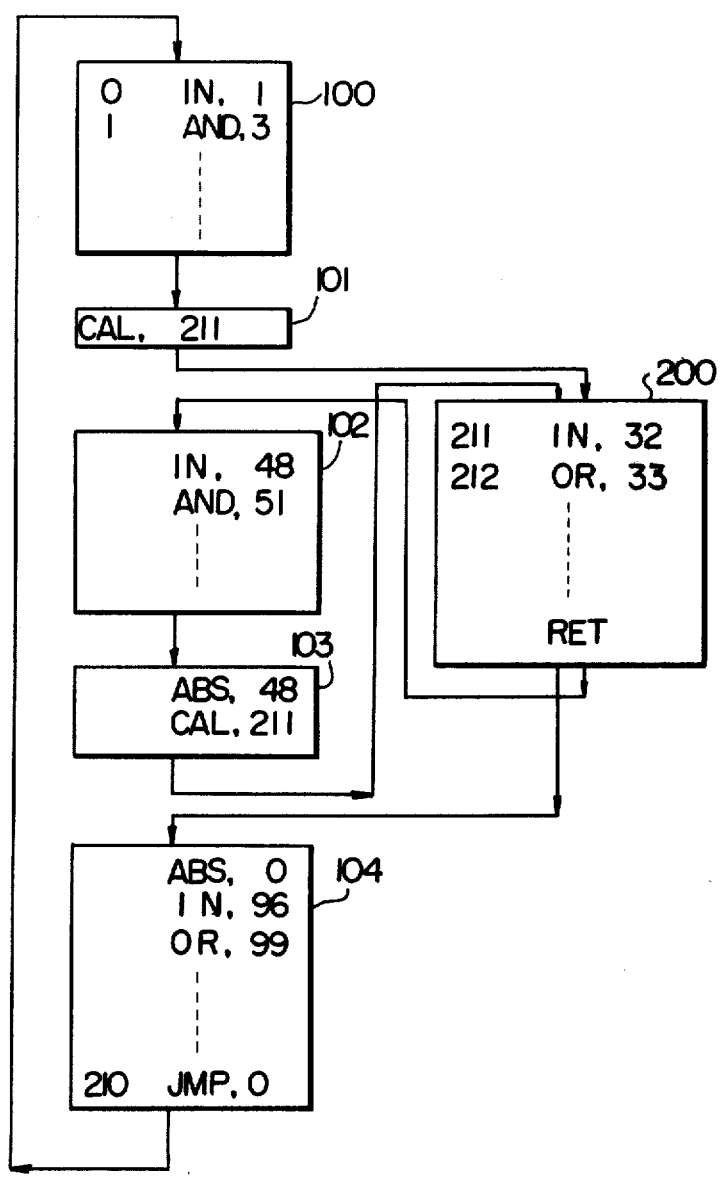
F I G. 5

PLURAL-SEQUENCE CONTROL SYSTEM

The present invention relates to a sequence control system for controlling a plurality of objects.

The present invention will be described in conjunction with the accompanying drawings in which:

FIG. 2 illustrates an arrangement of instructions employed in the system shown in FIG. 1;

FIG. 4 illustrates an arrangement of additional instructions required in the operation of the sequence control system according to the invention; and FIGS. 5 and 6 illustrate example of programs executed in accordance with the teachings of the invention.

Prior to description of the present invention, a sequence control system of hitherto known type will be described by referring to FIGS. 1 and 2 for a better understanding of the invention.

Figure 1:
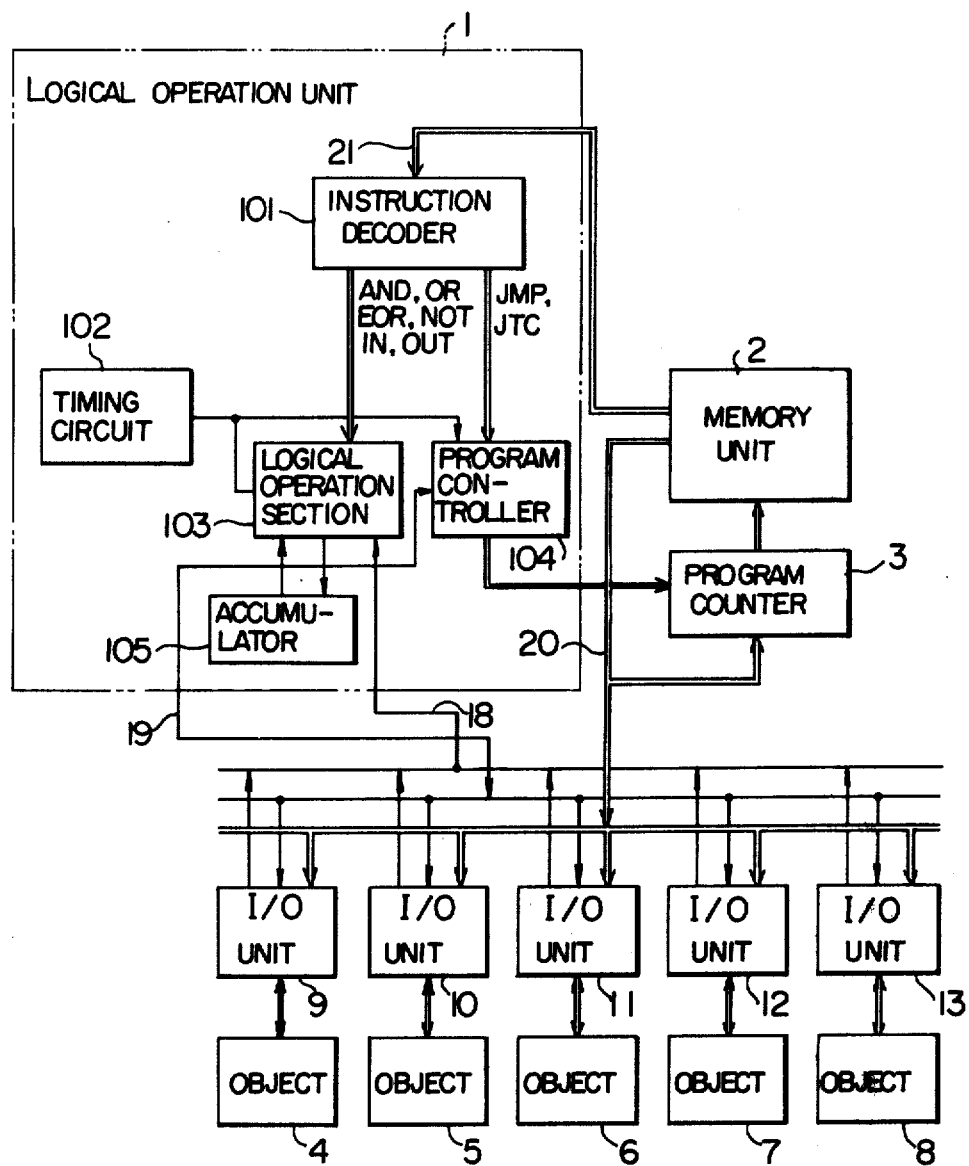
FIG. 1 is a block diagram showing a hitherto known sequence control system.

The hitherto known sequence control system shown in FIG. 1 comprises a logical operation unit 1, a memory unit 2 and a program counter 3 for allowing the contents of a program in the memory unit to be logically processed. In this respect, the sequence control system has similarities to a usual computer. But, the sequence control system is distinctively different from the usual computer in the following points. Namely, (1) The operation of the logical operation unit has to be performed directly to the associated object or process to be controlled through an accumulator included in the logical operation unit and an I/O (input and output) device. (2) To this end, instructions stored in the memory unit at predetermined program addresses have necessarily to be associated directly with addresses of the I/O units corresponding to the objects or processes to be controlled.

The sequence control system shown in FIG. 1 includes objects or processes 4–8 to be controlled, I/O units 9–13, an input bus 18, an output bus 19, an addressing bus 20 and an instruction code line 21.

A timing circuit 102 generates timing clock pulses required for the logical operation unit 1. The timing circuit 102 may comprise a combination of quartz oscillator, counter, and decoder. Pulses generated from the quartz oscillator are distributed to plural outputs to provide a multi-phase clock pulse signal. The multi-phase clock pulse signal is used to provide a synchronized operation in the logical operation unit 1.

Instruction codes contained in the information read out from the memory unit 2 are fed to an instruction decoder 101 to be decoded. The instruction decoder 101 receives the fed instruction codes and provides their outputs at output terminals corresponding to the respective instructions. The instruction decoder 101 may comprise a combination of conventional known logic gate elements, ROM or a programmable logic array (e.g. DM7575 manufactured by National Semiconductor Corporation). The decoded instructions AND, OR, EOR, NOT, IN and OUT are supplied to a logical operation section 103, while the instructions JMP (unconditional JUMP) and JTC (conditional JUMP) are fed to a program controller 104. The logical operation section 103 may comprise conventional known logic elements for performing logical operations of AND, OR, EOR, NOT, IN, and OUT and these logic elements are selected by the outputs from the instruction decoder 101. In accordance with the instructions specified by the instruction decoder 101, the desired logical operations are executed on the input signal incoming through the input bus 18 and information or data available from under-mentioned an accumulator 105 and the results of the logical operations are returned to the accumulator 105 or are applied to the output bus 19 under the control of the timing circuit 102. With the instruction OUT, the output from the accumulator 105 is written in the I/O units. On the other hand, the program controller 104 executes the instructions JMP and JTC applied thereto which change the flow of program. The program controller 104 provides a count-up or write signal as a control signal to the program counter 3 in accordance with the output from the accumulator 105 and the clock pulses from the timing circuit 102 and in dependence upon a type of the jump instructions. This function of the program controller 104 can be realized by a combination of conventional known logic elements.

The accumulator 105 is provided for reserving the results of the logical operation executed by the logical operation section 103 and providing its output to the logical operation section 103 when the execution of the next instruction is required. The logical operation section 103, after the execution of the logical operation on the output from the accumulator 105, usually supplies the results of the logical operation to the accumulator 105 for writing therein. For the instructions IN and OUT, however, the logical operation section 103 supplies the contents of the input 18 to the accumulator 105 for writing therein upon the instruction IN and supplies the output of the accumulator 105 on the output bus 19 upon the instruction OUT. Such a function of the accumulator 105 can be realized by conventional known flip-flop circuits.

The instructions shown in FIG. 2 are stored in the memory unit 2. Each of the instruction words is composed of an operation instruction code or operand code OP of 4 bits and an address code n of 12 bits for the input and output address of the associated object or process to be controlled. The instruction word is stored at a predetermined program address in the memory 2. Symbol (n) appearing in the column "CONTENTS OF PROCESSINGS" of FIG. 2 represents the state of the object assigned with the input and output address n, symbol PC program counter, symbol (PC) contents of the program counter PC, symbol A accumulator, and symbol (A) contents of the accumulator A.

The logical operation unit 1 performs logical operations in accordance with the 4-bit operand codes supplied from the memory unit 2 through the instruction code line 21. Nine types of the instruction codes such as shown in FIG. 2 are used. In the memory unit 2 are stored instructions containing these instruction codes in accordance with the contents of processings as required. Instructions stored in the memory unit 2 are sequentially read out in accordance with the program addresses designated by the program counter 3 which in turn is controlled by the control signals from the logical operation unit 1. Thus, the contents in the program counter 3 are up-to-dated, as the program is advanced or each of the instructions has been executed.

States of the objects 4–8 are controlled by the logical operation unit 1. Among such states to be controlled, there may be enumerated "on" or "off" states of a contact or switch, open or closed state of a valve, starting or stopping of an electric motor or the like. Some states of the controlled objects such as "on" and "off" states of a limit switch may be utilized in the logical operations. These states are controlled through the output bus 19 and the I/O units 9–13 and are detected through the input bus 18 and the I/O units 9–13. Further, selection of the states of the controlled processes is effected through the addressing bus 20. Each of the I/O units 9–13 has three principal functions; i.e. (1) conversion of the signal level at the output bus 19 to a level suited for driving the controlled object such as a contact, valve or the like (output processing), (2) conversion of the signal level of the controlled objects 4–8 to a level suited to be processed at the input bus 18 (input processing), and (3) selection of one of the states of the controlled objects 4–8 corresponding to an input and output address designated by the addressing bus 20.

When each of the controlled objects 4–8 has a plurality of different states, then these states are assigned with different input and output addresses. For example, it is assumed that the controlled objects 4–8 are assigned with the input and output addresses in the following manner;

| Object | Input Address | Output Address |
|--------|---------------|----------------|
| 4 | 0 to 31 | 256 to 271 |
| 5 | 32 to 47 | 288 to 303 |
| 6 | 48 to 63 | 304 to 335 |
| 7 | 80 to 95 | 336 to 351 |
| 8 | 96 to 127 | 352 to 383 |

FIG. 2 shows an example of arrangement of instructions for the sequence control system with which the input and output addresses assigned in the above manner are associated. As can be seen from FIG. 2, each of the instructions is composed of 16 bits in which four upper bits constitute the operand code for designating the type of the operation to be executed, while the 12 remaining bits, constitute the address code representing an input and output address n. The logical operation unit 1 includes the one-bit accumulator 105. A signal on the input bus 18 or output but 19 is a one-bit signal of logic "1" or "0." The instructions AND, OR and EOR command that the logical product, the inclusive logical sum and the exclusive logical sum should be determined through the logical operations by the logical operation unit 103 between the designated input and output address n and the contents (A) of the accumulator 105 and the results should be stored in the accumulator 105. For example, the context of the execution for the instruction AND is as follows. A 12-bit address code obtained from the output of the memory jnit 2 is applied to the I/O units through the addressing bus 20 so that a selected input signal is obtained on the input bus 18. The input signal corresponds to (n) shown in FIG. 2. Then, a logical product is carried out between (n) and the contents (A) of the accumulator 105 and the results are written in the accumulator 105. The contents of the program counter 3 are updated in preparation for the next instruction to be executed. Thus, the execution of the instruction AND terminates. The instruction NOT commands that a complement of the contents (A) in the accumulator 105 should be determined through the logical operation by the logical operation section 103 and the results should be in the accumulator 105. The instruction IN commands that the state at an input and output address designated by n should be read out and stored in the accumulator 105. The context of the execution for the instruction IN is substantially the same as that of the instruction AND described above, except that no operation on the input signal is carried out and the input signal is intact stored in the accumulator 105. The instruction OUT commands that the contents (A) of the accumulator 105 be output as the state at the address designated by n. Upon occurrence of the instruction NOP, no processing is executed and the operation is shifted to a succeeding instruction.

In the case of the above-described instructions, except the instructions NOT and NOP the 12-bit address represents the input and output address n, and the program counter 3 is advanced step-by-step every time when each of these instructions has been executed. On the other hand, the instructions JMP (unconditional JUMP) and JTC (conditional JUMP) command that the contents (PC) of the program counter 31 should be altered. Upon the instruction JMP, the contents of the program counter 3 will be replaced by the 12-bit input and output address n. Upon the instruction JTC, the contents of the accumulator 105 are examined and the contents of the program counter 3 are replaced by the address n only when the contents (A) of the accumulator 105 are equal to logic "1." When the contents (A) of the accumulator are equal to logic "0," the contents of the program counter 3 are advanced for one position as in the case of the instruction NOP.

Combinations of the above-described instructions are stored in the memory unit 2 as a program in accordance with the contents of processings required to be executed and are sequentially read out in dependence upon the contents of the program counter 3 thereby to perform the desired controls. The four upper bits of the instruction as read out are supplied to the logical operation unit 1 through the instruction code line 21 to command the type of operation to be processed by the logical operation unit 1, while the twelve remaining bits are applied to the associated I/O unit 9–13 through the addressing bus 20. However, upon executing the instructions JMP and JTC, these twelve bits are written in the program counter 3 in accordance with the control signal from the logical operation unit 1. Except for this case, the program counter 3 is advanced for one position.

As is appreciated from the foregoing description, the sequence control system is characteristically different from a digital computer in that the number of the instructions are decreased to a minimum required necessarily for the logical operations and at the same time the function of addressing is simplified thereby to facilitate the arrangement of the hardwares and make it possible to prepare program easily for those having no knowledge of computer. An example of such sequential control system is disclosed in detail by the periodical "FUJI ELECTRIC REVIEW", Vol. 19, No. 1, 1973, pp. 15 to 22. It is noted that program memory, step counter (STC), input unit and output unit, instruction decoder, internal timer, logical operation circuit, control circuit, and accumulator (ARG) shown in FIG. 1 on page 16 of the Fuji Electrical Review respectively correspond to memory unit 2, program counter 3, I/O units 9 through 13, instruction decoder 101, timing circuit 102, logical operation section 103, program controller 104, and accumulator 105 shown in FIG. 1 of this application. A similar system is also disclosed in the periodical "CONTROL ENGINEERING", Vol. 18, No. 4, April 1971, pp. 49 to 60.

In the above-described sequence control system, identical processings are often performed repeatedly for individual objects to be controlled, when these objects are of a similar type. In such a case, since the states of the controlled objects for which the similar processing is to be performed are assigned with different input and output addresses, it is impossible to use the same program repeatedly. For this reason, the same program portion will make appearance many times in the program stored in the memory unit such as shown in FIG. 1, and the number of the same program portions will be increased, as the number of the objects to be controlled increases.

On the other hand, in the case of the digital computer, when the same processing is to be repeatedly carried out for many objects, such as a processing is often programmed as a subroutine so that the efficiency of the program is enhanced. However, in the case of the sequence control, it is impossible to program the repeatedly executed processing as a subroutine, because the number of the instructions is restricted to a minimum, as described above. Accordingly, a lot of time is required for the preparation of the program. Besides, the memory unit has to be implemented with a large capacity. As an attempt to eliminate such disadvantages, it is conceivable that the contents of the address code of instruction be altered by other instructions which themselves are also programmed, as is the case of the digital computer. To this end, however, complicated hardwares and softwares are required in the implementation of the instructions, as a result of which advantages of the sequence control such as above mentioned will become unavailable.

Accordingly, an object of the present invention is to provide a sequence control system which allows the same program portion to be repeatedly utilized by using additional instructions for altering the input and output address of the instruction for the processing thereby to enhance the efficiency of the program and to reduce the memory capacity without involving no material complexity in the arrangement of the softwares and hardwares.

Figure 3:
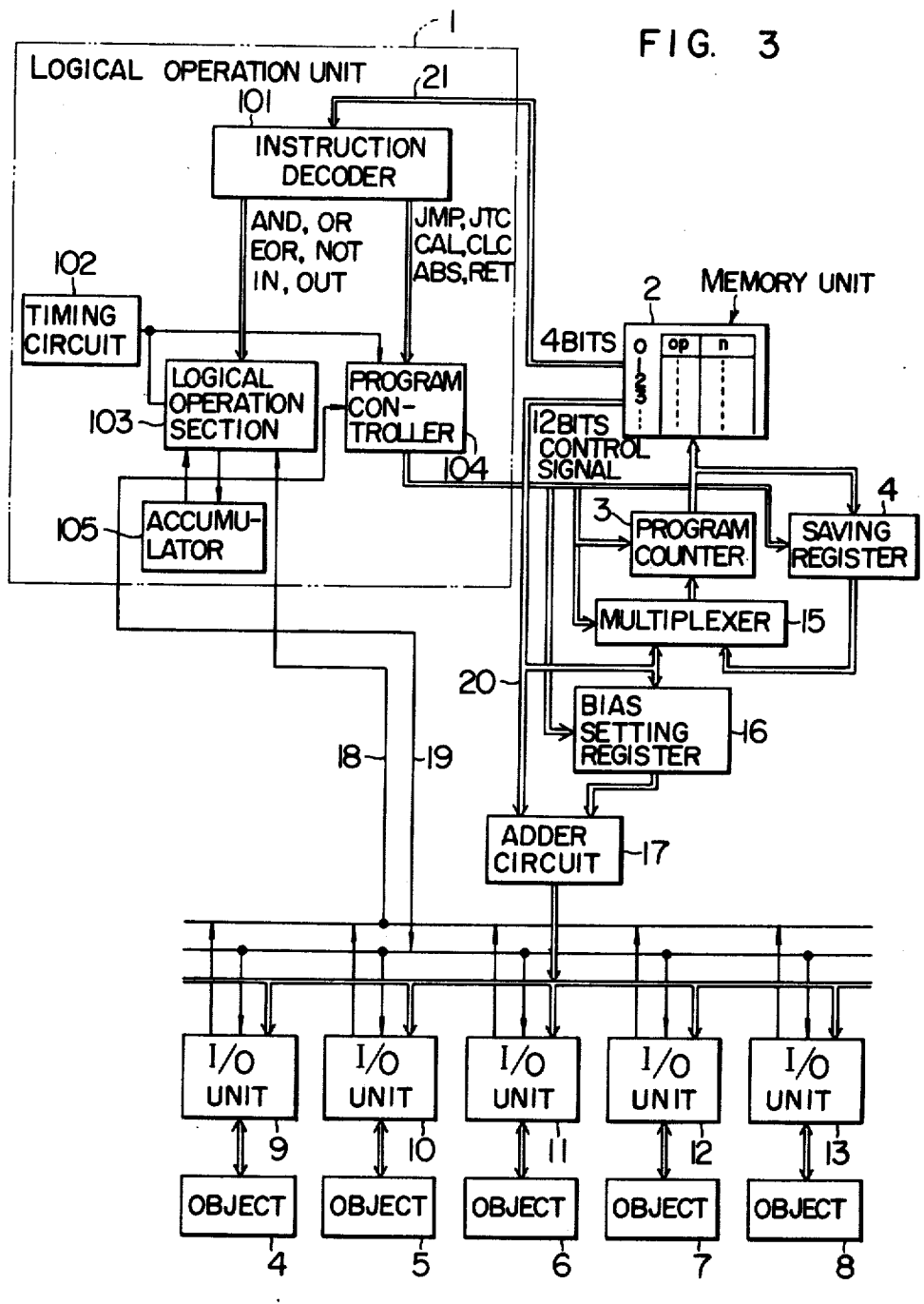
FIG. 3 is a block diagram of an embodiment of the sequence control system according to the invention.

FIG. 3 shows an embodiment of the sequence control system according to the present invention. Similarly to FIG. 1, the system comprises a logical operation unit 1, a memory unit 2, a program counter 3, objects 4-8 to be controlled, I/O units 9-13, an input bus 18, an output bus 19, an addressing bus 20 and an instruction code line 21. According to the invention, the system is provided with a saving register 14, a multiplexer 15, a bias setting register 16 and an adder circuit 17. The logical operation unit 1 includes of hardwares 101 to 105 which operate in the same manner as the corresponding ones shown in FIG. 1, excepting that a new function is added to the progam controller 104. Namely, the program controller 104 in FIG. 1 generates only the count-up and write signals to the program counter 3 but the program controller 104 in FIG. 3 further generates a write signal to the saving register 4 on the bias setting register 16 and a selection command to the multiplexer 15. The multiplexer 15 is a conventional IC circuit (e.g. SN 74,157 manufactured by Texas Instruments Inc.), which selects and provides one of plural inputs in accordance with the selection command.

Figures 4, 6:
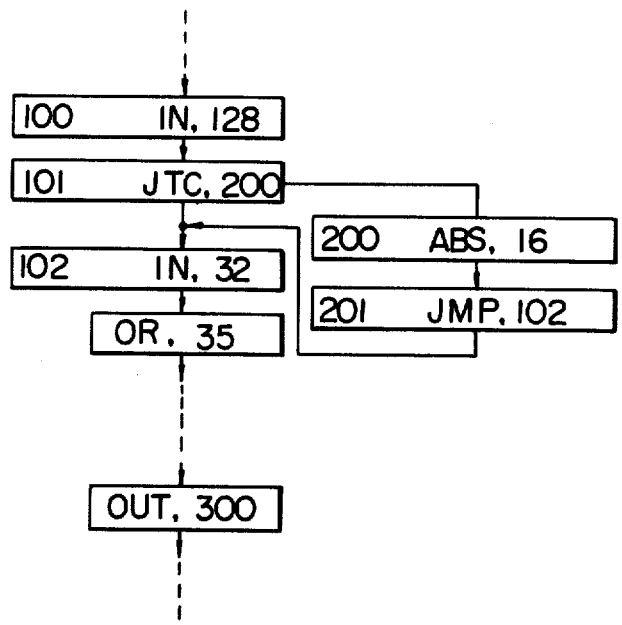

In the case of the sequence control system shown in FIG. 3, four additional instructions such as shown in FIG. 4 are employed in addition to the instructions shown in FIG. 2. In other words, thirteen types of instructions are used. Referring to FIG. 4, the instructions CAL (unconditional CALL) and CLC (conditional CALL) serve to replace the contents of the program counter 3 by the address code n of the CALL instruction, as is in the case of the JUMP instructions JMP and JTC shown in FIG. 2. Upon the CALL instruction, the contents of the program counter 3 are saved. Difference between the CALL instructions CAL and CLC has same effect as that between the JUMP instructions JMP and JTC shown in FIG. 2. The context of the execution for the instruction CLC is as follows. The contents of the accumulator 105 are examined. When the contents of the accumulator 105 are equal to logic "1" the contents of the program counter 3 are written in the saving register 4 while an address code of 12 bits is written in the program counter 3. When the contents of the accumulator 105 are equal to logic "0," only the update of the contents in the program counter 3 is carried out. The RETURN instruction RET commands that the saved contents shold be returned to the program counter 3 and are used in executing a subroutine in combination with the CALL instruction. The ADDRESS BIAS SET instruction ABS serves to shift the input and output address. The bias value set by this instruction is added to the values of the input and output addresses of the individual instructions.

Referring to FIG. 3, the saving register 14, the multiplexer 15, the bias setting register 16 and the adder circuit 17 are provided with a view to executing the instructions shown in FIG. 4. When the CALL instruction has been executed, the contents of the program counter 3 are written in the saving register 14 in accordance with the control signal from the logical operation unit 1. Inversely, upon the RETURN instruction RET, the contents of the saving register 14 are written back in the program counter 3. On the other hand, upon the JUMP instruction, the 12-bit address code of the instruction read out to the addressing bus 20 is written in the program counter 3. In this manner, the input to the program counter 3 is switched by the multiplexer 15 in accordance with the control signal from the logical operation unit 1.

When the instruction ABS has been executed, the 12-bit address code of this instruction supplied to the addressing bus 20 is written in the bias setting register 16 in accordance with the control signal from the logical operation unit 1 and the contents in the program counter 3 are updated. The output from the bias setting register 16 is applied to the adder circuit 17 and added to the address n of the instruction supplied to the addressing bus 20. The output from the adder circuit 17 is supplied to the I/O units 9-13. In this manner, it is possible to modify the address portions of the individual instructions with the aid of the instruction ABS.

FIG. 5 illustrates an example of program which can be executed by the embodiment of the sequence control system according to the present invention shown in FIGS. 3 and 4. The program is stored at the program addresses 0 to 210 in the memory unit 2 for the objects 4-8 to be controlled shown in FIG. 3. The program of FIG. 5 comprises program sections 100 to 104 for the controlled objects 4-8 on the assumption that the same processing is conducted for the controlled objects 5 and 7 by using a common subroutine 200.

When the execution of the program is started from the program address 0, the processing for the controlled object 4 is executed in accordance with the program section 100. Subsequently, at the program section 101, the CALL instruction is executed and the program counter 3 is set at the address 211. At the same time, the leading program address in the program section 102 is saved by the saving register 14 to be reserved therein. Steps from the address 211 to the instruction RET constitute the subroutine 200 for executing the processings common to both the controlled objects 5 and 7. At the program section 101, the contents in the bias setting register 17 are equal to zero. At the step for the address of 211, the state of the controlled object 5 designated by the input and output address 32 is entered in the accumulator 105 of the logical operation unit 1. The subroutine 200 terminates in the instruction RET. Upon executing of this instruction RET, the leading program address in the program section 102 is transferred from the saving register 14 to the program counter 3 so that the program control is directed to the program section 103.

The program section 102 is destined for the controlled object 6. At the completion of this program section, the processing is shifted to the program section 103 for the controlled object 7. During this program section 103, the instruction ABS is at first executed so that the contents of the bias setting register 17 are altered from 0 to 48. Subsequently, the CALL instruction is executed so that the leading program address in the program section 104 is saved by the saving register 14. At the same time, the contents of the program counter 3 are altered to 211 so that the program control is taken by the subroutine 200. Since the contents of the bias setting register 17 is equal to 48, the state of the controlled object 7 assigned by the input and output address 32 + 48 = 80 is loaded in the accumulator 105 of the logical operation unit 1 at the step of instruction IN corresponding to the address 211. In this manner, the processing for controlling the object 7 is carried out by executing the subroutine 200.

At the final step of the subroutine 200, the instruction RET is executed and the leading address of the program section 104 stored in the saving register 14 is written into the program counter 3. Thus, the program control is directed to the program section 104. At the first step of the program section 104, the instruction ABS is executed so that the contents in the bias setting register 17 are reset to 0. Subsequently, the processing for controlling the object 8 is carried out by executing the program section 104. Then, the contents in the program counter 3 are reset to 0 as a result of the executed JUMP instruction at the program address 210, and the processing for the controlled object 4 is again carried out through the program section 100. It will thus be appreciated that the same processing can be conducted for a plurality of objects by executing the subroutine common to these objects.

FIG. 6 shows another example of a program which can be executed by the sequence control system according to the present invention by virtue of the shifting function of the input and output addresses. In the case of the program shown in FIG. 6 which is intended for the sequence control through duplicated I/O units. In more detail, it is assumed by way of example that normal input states are assigned with addresses 32 to 47 and normal output states are assigned with addresses 288 to 303. When failure occurs in any one of the I/O units, the above input addresses are altered to 48 to 63 and the output addresses are altered to 304 to 319, thereby to permit the changing-over of the failed unit to the stand-by unit.

Referring to FIG. 6, when the program at the program address 100 is executed, a signal indicating the state of the I/O unit assigned with the input and output address 128 is loaded into the accumulator 105 of the logical operation unit 1 and the contents of the accumulator 105 are examined at the program address 101. When the contents of the accumulator 105 are logic "1," the program counter 3 is set to 200 and the program run is jumped to the program address 200. At this address, the contents of the bias setting register 17 are altered from 0 to 16 through the instruction ABS and then the program run is returned to the address 102 through the JUMP instruction at the program address. On the other hand, when the contents of the accumulator 105 are logic "0" at the program address 101, the contents of the program counter 3 will be incremented to 102 and the program run is stepped up to the program address 102.

In this manner, when the abnormal state is detected, the instructions at the program addresses succeeding to the program address 102 which are for the abnormal states of the I/O units assigned with the input addresses 32 to 47 and output addresses 288 to 303 are replaced by the instructions for the states of the stand-by I/O units assigned with the input addresses 48 to 63 and output addresses 304 to 316. In the program shown in FIG. 6, neither the CALL instruction nor RETURN instruction is employed. In such a case, the saving register 14 and the multiplexer 15 are of course unnecessary and can be omitted to simplify the arrangement of the sequence control system such as shown in FIG. 3. According to the just above described embodiment, it is possible to provide the I/O units in a duplicated manner with a relatively simple arrangement in respect of the hardwares and the softwares.

As will be appreciated from the foregoing description, a portion of a program can be repeatedly utilized for a plurality of the controlled objects of the same type with a simplified arrangement in accordance with the teaching of the present invention. By virtue of this feature, time consumption in the preparation of program is reduced. Further, a small storage capacity of the memory unit 2 is sufficient for the intended control purposes. Besides, the sequence control system according to the present invention can be advantageously implemented merely by adding and/or modifying some hardwares to or of the hitherto known sequence control system.

What is claimed is:

1. A sequence control system for controlling a plurality of external devices, comprising:
   a plurality of input/output units for receiving, as inputs, quantities representative of states of said devices and providing outputs to said devices, said objects being assigned with predetermined input and output addresses respectively;
   a logical operation unit for receiving said quantities representative of the states of the respective devices to perform logical operations on said quantities, the results of the logical operations being supplied to said input/output units;
   a memory unit for storing a group of programmed instructions including logical operation instructions for performing the logical operations by said logical operation unit, the logical operation instructions being selectively associated with the input and output addresses of said input/output units so that each of the logical operations by said logical operation unit is carried out with respect to the input and output unit having the associated input/output address, said instructions being stored at predetermined program addresses in said memory unit respectively;

a program counter for designating the program addresses for readout of the program address designated instructions from said memory unit;

a bias value register for storing values of bias for the input and output addresses of said input/output units in accordance with a first predetermined one of said instructions from said memory unit other than the logical operation instructions under the control of said logical operation unit;

selecting means for biasing in accordance with the contents of said bias value register the input and output address associated with the logical operation instruction from said memory unit to select one of said input/output units corresponding to the biased input and output address; and a saving register for temporarily saving during an interrupt the contents of said program counter for later return under the control of said logical operation unit.

2. A sequence control system according to claim 1, wherein said selecting means includes an adder circuit which produces a sum of the input and output bias value stored in said bias value register and the input and output address associated with the logical operation instruction from said memory unit.

3. A sequence control system according to claim 1, wherein the contents of said saving register is used to modify the contents of said program counter in accordance with a second predetermined one of said instructions from said memory unit other than the logical operation instructions.

4. A sequence control system according to claim 1, further comprising a multiplexer for resetting said program counter with the contents of said saving register in accordance with a second predetermined one of said instructions other than the logical operation instructions from said memory unit.

5. A sequence control system according to claim 1, wherein said instructions stored in said memory unit includes an instruction for writing the contents of said program counter in said saving register and an instruction for writing the contents of said saving register in said program counter.

* * * * *